United States Patent [19]
Arikawa et al.

[11] Patent Number: 5,150,950
[45] Date of Patent: Sep. 29, 1992

[54] ANTI-SKID BRAKE CONTROL METHOD

[75] Inventors: Tetsuro Arikawa; Toshiyuki Abe, both of Yokohama, Japan

[73] Assignee: Nippon A B S Ltd., Kaigan, Japan

[21] Appl. No.: 559,331

[22] Filed: Jul. 30, 1990

[30] Foreign Application Priority Data

Jul. 31, 1989 [JP] Japan ................................ 1-199012
Sep. 22, 1989 [JP] Japan ................................ 1-246678

[51] Int. Cl.$^5$ .............................................. B60T 8/32
[52] U.S. Cl. ................... 303/100; 188/181 C;
303/96; 303/98; 303/102; 303/108; 303/116 R;
303/111; 303/113 AP
[58] Field of Search ............... 303/111, 119, 100, 96,
303/97, 98, 102, 103, 105, 106, 107, 108, 109,
116, 113, 119 R, 116 R, 116.8 P; 188/181 C, 181
A, 181 R; 364/426.01, 426.02, 426.03; 180/197

[56] References Cited

U.S. PATENT DOCUMENTS

| 4,418,966 | 12/1983 | Phattwig | 303/100 |
| 4,451,096 | 5/1984 | Gygax | 303/109 |
| 4,547,022 | 10/1985 | Brearley et al. | 303/6 C |
| 4,652,060 | 3/1987 | Miyake | 303/96 |
| 4,657,313 | 4/1987 | Fennel et al. | 303/96 |
| 4,717,209 | 1/1988 | Hagiya et al. | 303/111 |
| 4,783,126 | 11/1988 | Aikawa | 303/96 |
| 4,793,662 | 12/1988 | Arikawa | 303/96 |
| 4,893,880 | 1/1990 | Arikawa | 303/110 |
| 4,979,784 | 12/1990 | Arikawa | 303/111 |

FOREIGN PATENT DOCUMENTS 85052 5/1989 Japan .
2206386 1/1989 United Kingdom .

Primary Examiner—Douglas C. Butler
Attorney, Agent, or Firm—Carothers and Carothers

[57] ABSTRACT

In a fluid-pressure control apparatus for anti-skid control apparatus, including a control unit for generating brake control signals corresponding to the rotational behaviors of the respective wheels and valve control signals on the basis of the outputs of the wheel speed sensors; and fluid pressure control valves arranged in the respective brake conduit systems and operated by the valve control signals the brake control signals from the front wheels are preferentially used to those from the rear wheels as the valve control signals in the respective brake conduit systems, and when the brake control signal is generated fron any one of the front wheels, the fluid pressure control valve in the one brake conduit system to which the one front wheel belongs, is operated by using the brake control signal as the valve control signal; and when the brake control signal is generated from any one of the rear wheels, the fluid pressure control valve in the one brake conduit system to which the one rear wheel belongs, is operated by using the brake control signal as the valve control signal, if the following condition (a) or (b) is fulfilled: (a) the condition that the vehicle deceleration is larger than a predetermined reference deceleration and the straight-running of the vehicle is detected; (b) the condition that the vehicle deceleration is larger than a predetermined reference deceleration and slip of the other rear wheel is larger than a predetermined first reference slip.

17 Claims, 5 Drawing Sheets

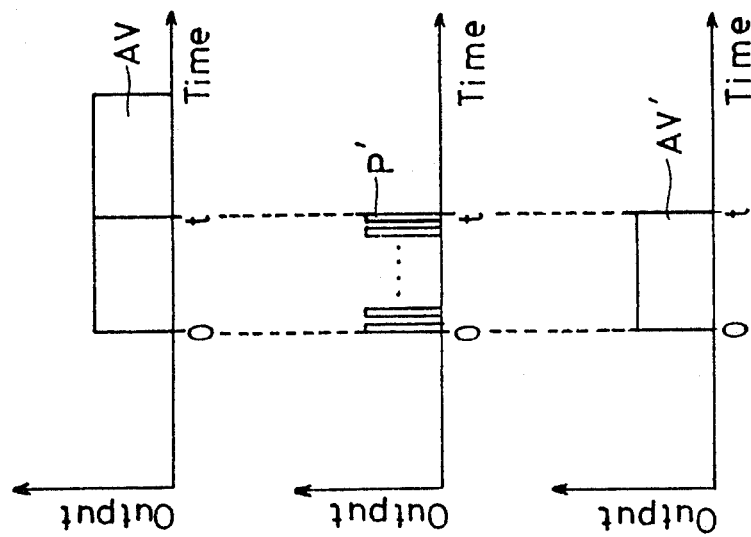
FIG. 7(A)
FIG. 7(B)
FIG. 7(C)
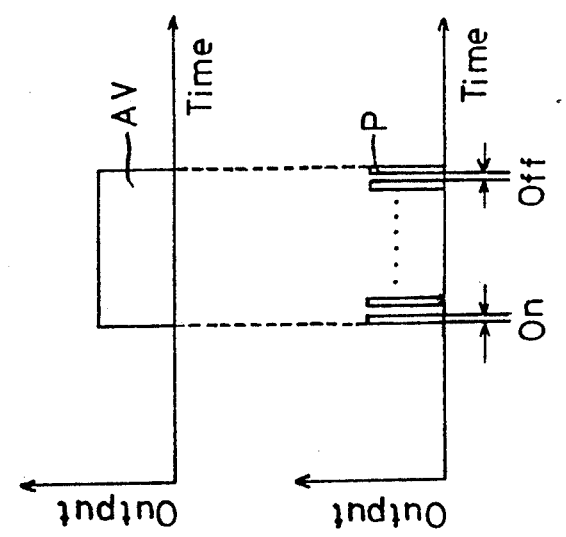
FIG. 6(A)
FIG. 6(B)

ANTI-SKID BRAKE CONTROL METHOD

BACKGROUND OF THE INVENTION

1. Field of the Invention

This invention relates to an anti-skid brake control method for vehicle of X-brake conduit system.

2. Description of the Prior Art

U.S. Pat. No. 4,740,040 discloses:

An anti-skid control vehicle braking apparatus with pairs of front and rear wheels; wheel speed sensors associated with the wheels; first and second fluid pressure control valve devices for respectively controlling the brake fluid pressure of the wheel cylinders of the front wheels; a control unit receiving outputs of the wheel speed sensors for measuring or judging the skid conditions of the front and rear wheels and for generating instructions for controlling the fluid pressure control valve devices; a valve apparatus for generating a fluid pressure in accordance with the lower one of the brake fluid pressures of the front wheels controlled with the control valve devices, being arranged between the front wheel cylinders and rear wheel cylinders. The control unit discriminates the frictionally lower one of the sides of the road on which the wheels are running, on the basis of the measuring or judging results of the skid conditions of rear wheels, combines logically the measuring or judging results of the skid conditions of the rear wheels with the measuring or judging result of the skid condition of one front wheel running on the lower side for generating the instruction for controlling one of fluid pressure control valve devices, and generates the instruction for controlling the other control valve device, on the basis of the measuring or judging result of the skid condition of the other front wheel running on the frictionally higher side independently of those of the rear wheels.

The above described fluid-pressure control apparatus for 2-channel anti-skid apparatus can be smaller, lighter and more inexpensive than the prior fluid-pressure control apparatus. Even when the rear wheel tends to lock sooner than the front wheel, the rear wheel can be surely prevented from locking, by the above fluid-pressure control apparatus. Further, all of the wheels can be securely prevented from locking thereby. The steering and the directional stability of the vehicle can be better. The above effects of the lock-prevention of the rear wheel and of the security of the directional stability are caused not only by the control method of the above fluid-pressure control apparatus, but also greatly by the valve apparatus or the pressure-selecting apparatus arranged in the above fluid pressure control apparatus.

However, it is required that a fluid pressure control apparatus is further smaller, lighter and more inexpensive, in order that an anti-skid apparatus is widely used in the world.

For example, the Japanese Patent Opening Gazette No. 160342/1986 discloses a fluid pressure control apparatus for 2-channel X-brake conduit type anti-skid apparatus in which the above-described pressure selecting apparatus is not provided. In the control method of the above fluid pressure control apparatus, when it is detected that any of the front wheels almost locks, the fluid pressure is decreased in the one conduit system to which the almost locking front wheel belongs. And when it is detected that any of the rear wheels almost locks, the one rear wheel which tends to lock sooner than the other rear wheel is made to remain locked. When also the other rear wheel almost locks, the brake fluid pressure is decreased in the one conduit system to which the other rear wheel belongs.

However, in the above-described fluid pressure control apparatus, both of the rear wheels sometimes almost lock, or one of the rear wheels remains locked, when the other of the rear wheels almost locks. When the vehicle with the above-described fluid pressure control apparatus is running on a road which has such a braking frictional coefficient as to be intermediate (intermediate-$\mu$) or low (low-$\mu$), the one rear wheel sometimes continues to lock. At that time, the directional stability of the vehicle is deteriorated much. Even when the vehicle is running on a road which has a high braking frictional coefficient (H-$\mu$ road), the one rear wheel sometimes continues to lock. At that time, the so-called "flat-spot" phenomenon (partial wearing) occurs on the tyre of the one rear wheel which continues to lock. At an extreme case, there is the danger that the one rear wheel bursts.

SUMMARY OF THE INVENTION

Accordingly, it is an object of this invention to provide an anti-skid brake control method by which a fluid pressure control apparatus can be smaller, lighter and more inexpensive, and further it can be avoided that a "flat-spot" phenomenon or "burst" occur on wheels.

In accordance with an aspect of this invention, a fluid pressure control apparatus for anti-skid control apparatus, includes: (A) a pair of front wheels and a pair of rear wheels diagonally connected to said front wheels, in a dual brake conduit system; (B) wheel speed sensors associated respectively with the front and rear wheels and detecting rotational speeds of the wheels; (C) a control unit for generating brake control signals corresponding to the rotational behaviors of the respective wheels and valve control signals on the basis of the outputs of the wheel speed sensors; and (D) fluid pressure control valve means arranged in the respective brake conduit systems and operated by the valve control signals from the control unit. This apparatus is operable according to an anti-skid brake control method in which the brake control signals from the front wheels are preferentially used to the brake control signals from the rear wheels as the valve control signals in the respective brake conduit systems, and when the brake control signal is generated from one of the front wheels, the fluid pressure control valve means in the brake conduit system to which that one front wheel belongs, is operated by using the brake control signal as a valve control signal; And when the brake control signal is generated from one of the rear wheels, the fluid pressure control valve means in the brake conduit system to which that one rear wheel belongs, is operated by using the brake control signal as a valve control signal, if one of the following conditions (a) or (b) is fulfilled;

(a) The condition that the vehicle deceleration is larger than a predetermined reference deceleration and the straight-running of the vehicle is detected;

(b) The condition that the vehicle deceleration is larger than a predetermined reference deceleration and slip of the other rear wheel is larger than a predetermined first reference slip.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 6(A) is a time chart of the signal AV generated from the rear wheel for explaining operation of the third embodiment;

FIG. 6(B) is a time chart of the pulses of the pulse generator for explaining the operation of the third embodiment;

FIG. 7(A) is a time chart of the signal AV generated from the rear wheel for explaining one modification of the third embodiment;

FIG. 7(B) is a time chart of the pulses of the pulse generator for explaining the operation of the one modification of the third embodiment; and FIG. 7(C) is a time chart of the continuous signal AV' for explaining the operation of the one modification of the third embodiment.

DESCRIPTION OF THE PREFERRED EMBODIMENTS

First, concerning the showings in FIGS. 3, 4 and 5, in FIG. 3, the respective letters a, b, c, and so forth represent logic blocks as follows:

| | |
|---|---|
| a | Front Wheel AV? |
| b | Rear Wheel AV? |
| c | $a_{fz} \geq 0.6$ g? |
| d | $F_{ref}-V_{front} \leq 5$ Km/h? |
| e | Another Rear Wheel < 1.5% Slip? |
| f | Another Rear Wheel $\geq$ 15% Slip? |
| R | Pressure Decreasing Signal |
| g | Front Wheel EV? |
| h | Rear Wheel EV? |
| i | $a_{fz} \geq 0.6$ g? |
| j | $F_{ref}-V_{front} \leq 5$ Km/h? |
| k | Another Rear Wheel < 1.5% Slip? |
| l | Another Rear Wheel $\geq$ 15% Slip? |
| H | Pressure Holding Signal |
| Q | Pressure Increasing Signal |

Figure 4:
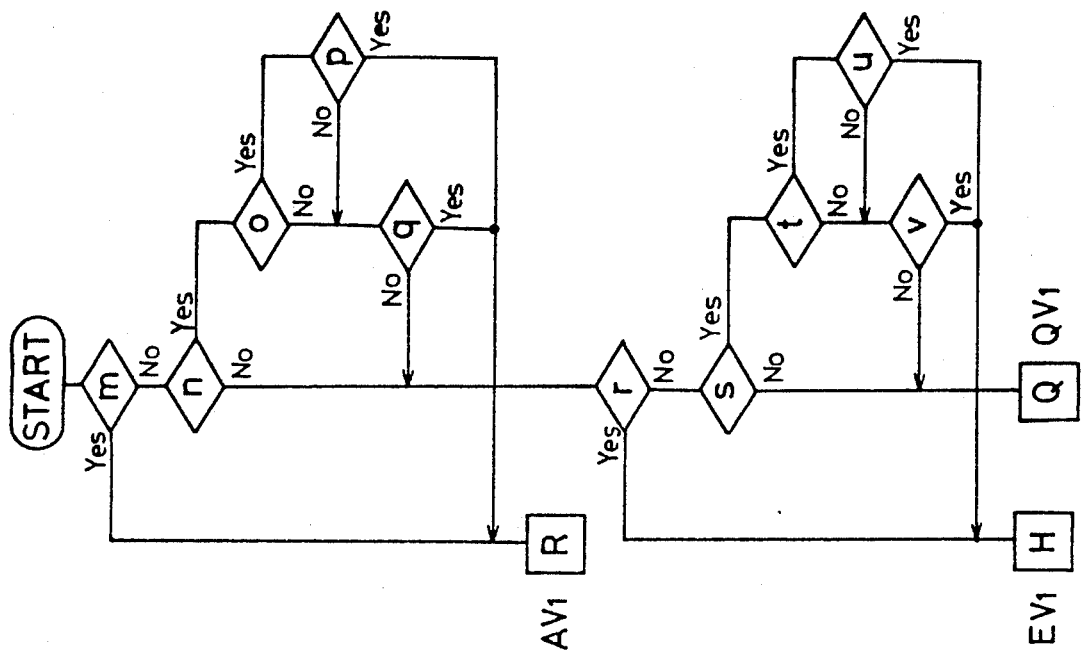
FIG. 4 is a control flow chart of a program included in a valve control signal generator in the control unit, according to a second embodiment of this invention.

In FIG. 4, the respective letters m, n, o, and so forth represent the following:

| | |
|---|---|
| m | Front Wheel AV? |
| n | Rear Wheel AV? |
| o | $a_{fz} \geq 0.6$ g? |
| P | $F_{ref}-V_{front} \leq 5$ km/h? |
| q | Another Rear Wheel $\geq$ 15% Slip? |
| R | Pressure Decreasing Signal |
| r | Front Wheel EV? |
| s | Rear Wheel EV? |
| t | $a_{fz} \geq 0.6$ g? |
| u | $F_{ref}-V_{front} \leq 5$ km/h? |
| v | Another Rear Wheel $\geq$ 15% Slip? |
| H | Pressure Holding Signal |

| | -continued |
|---|---|
| Q | Pressure Increasing Signal |

Figure 5:
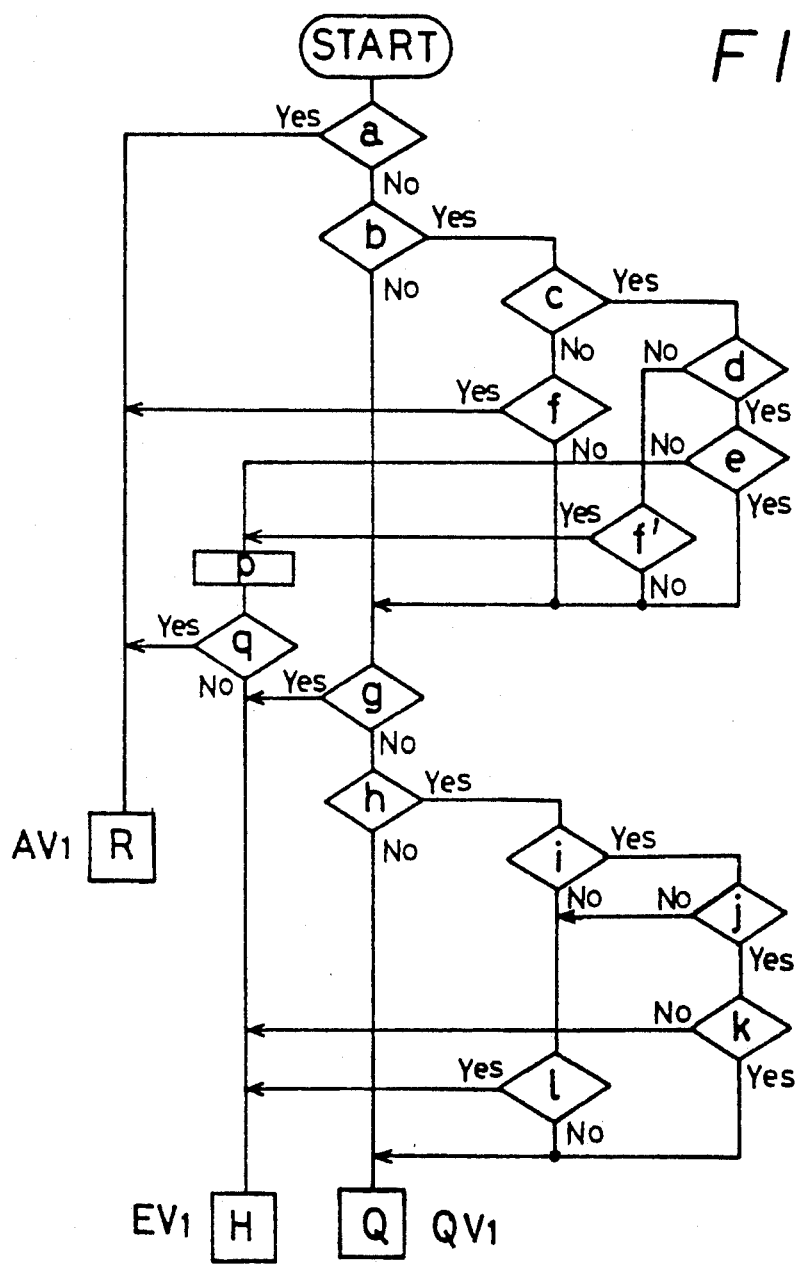
FIG. 5 is a control flow chart of a program included in a valve control signal generator in the control unit, according to a third embodiment of this invention.

In FIG. 5, the respective letters a, b, c, and so forth represent the following:>

| | |
|---|---|
| a | Front Wheel AV? |
| b | Rear Wheel AV? |
| c | $a_{fz} \geq 0.6$ g? |
| d | $F_{ref}-V_{front} \leq 5$ km/h? |
| e | Another Rear Wheel < 1.5% Slip? |
| f.f' | Another Rear Wheel $\geq$ 15% Slip? |
| p | 5 ms On—5 ms Off Pulse Generation |
| q | Pulse On Time? |
| R | Pressure Decreasing Signal |
| g | Front Wheel EV? |
| h | Rear Wheel EV? |
| i | $a_{fz} \geq 0.6$ g? |
| j | $F_{ref}-V_{front} \leq 5$ km/h? |
| k | Another Rear Wheel < 1.5% Slip? |
| l | Another Rear Wheel $\geq$ 15% Slip? |
| H | Pressure Holding Signal |
| Q | Pressure Increasing Signal |

Figure 1:
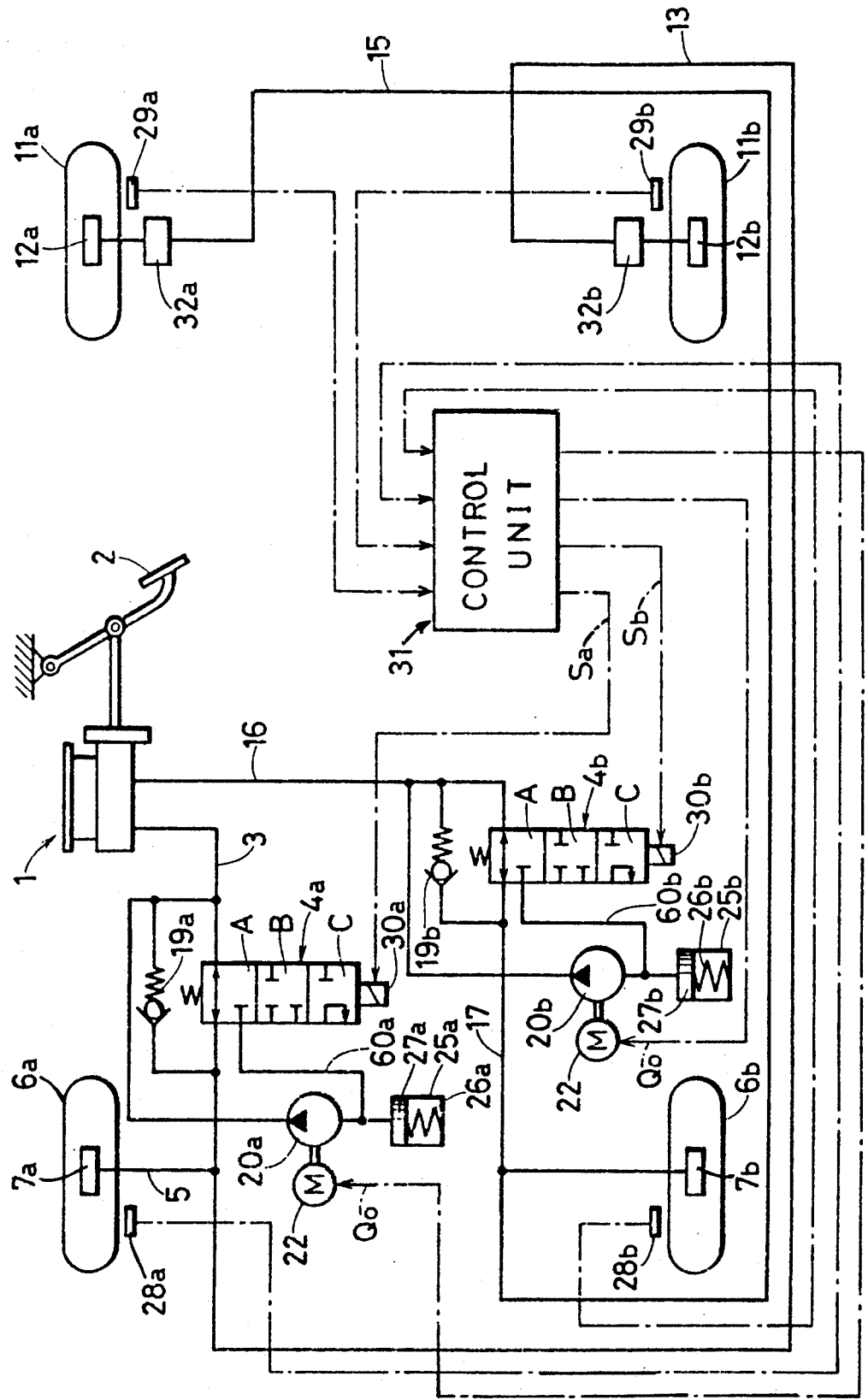
FIG. 1 is a schematic view of an anti-skid brake control apparatus according to the present invention.

In FIG. 1, a brake pedal 2 is connected to a tandem master cylinder 1. One fluid pressure chamber of the tandem master cylinder 1 is connected to a wheel cylinder of a right front wheel 6a through a conduit 3, an electro-magnetic three position three-port valve device 4a and a conduit 5. The conduit 5 is further connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electro-magnetic three-position three-port valve device 4b and a conduit 17. The conduit 17 is further connected to a wheel cylinder 12a of a right wheel 11a through a conduit 15 and a proportioning valve 32a.

Discharge openings of the valve devices 4a and 4b are connected through conduits 60a and 60b to hydraulic reservoirs 25a and 25b, respectively. The hydraulic reservoirs 25a and 25b include pistons 27a and 27b slidably fitted to casings and relatively weak springs 26a and 26b. Reserving chambers of the reservoirs 25a and 25b are connected to suction openings of fluid pressure pumps 20a and 20b.

Although the fluid pressure pumps 20a and 20b are schematically shown, each of them consists of a pair of casings, pistons slidably fitted to the casings, an electro-motor 22 reciprocating the piston, and check valves. Supply openings of the fluid pressure pumps 20a and 20b are connected to the conduits 3 and 16.

Wheel speed sensors 28a 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors 28a, 28b, 29a and 29b are supplied to a control unit 31 according to this invention.

Control signals Sa and Sb, and motor drive signals Qo as the calculation or measurement results are generated from the control unit 31, and are supplied to solenoid portions 30a and 30b of the electro-magnetic three position valve devices 4a and 4b and electro-motors 22, respectively. In FIG. 1 dash lines represent control signal conductors such as electric lead wires.

The electro-magnetic three position valve devices 4a and 4b have well-known constructions. The electro-magnetic three position valve devices 4a and 4b may take any one of three positions A, B and C in accordance with the current intensities of the control signals Sa and Sb.

When the control signals Sa and Sb are at a first intensity, e.g. "0" in current level, the electro-magnetic three position valve devices 4a and 4b take the first positions A for increasing the brake pressure to the brake for the wheel, respectively. In the first positions A, the master cylinder side and the wheel cylinder side are made to communicate with each other. When the control signals Sa and Sb are at a second intensity, e.g. "½" in current level, the electro-magnetic three position valve devices 4a and 4b take the second positions B for maintaining the brake pressure to the brake at constant, respectively. In the second positions B, the communications between the master cylinder side and the wheel cylinder side, and between the wheel cylinder side and the reservoir side are interrupted. When the control signals Sa and Sb are at a third intensity, e.g. "1" in current level, the electro-magnetic three position valve devices 4a and 4b take the third positions C for decreasing the brake pressure to the brake, respectively. In the third positions C, the communication between the master cylinder side and the wheel cylinder side is interrupted, while the communication between the wheel cylinder side and the reservoir side is made. The brake fluid is discharged through the conduits 60a and 60b into the hydraulic reservoirs 25a and 25b from the wheel cylinders 7a, 7b and 12a and 12b.

The control unit 31 further generates the drive signal Qo for the, motor 22. When any one of the control signals Sa and Sb becomes initially "1", the drive signal Qo is generated, and it is kept during the skid control operation. The drive signal Qo is supplied to the motor 22.

The wheels 6a, 6b, 11a and 11b are diagonally connected to each other in the above described manner.

Although the motors 22 are separately shown in FIG. 1, they may be combined with each other as one body.

Figure 2:
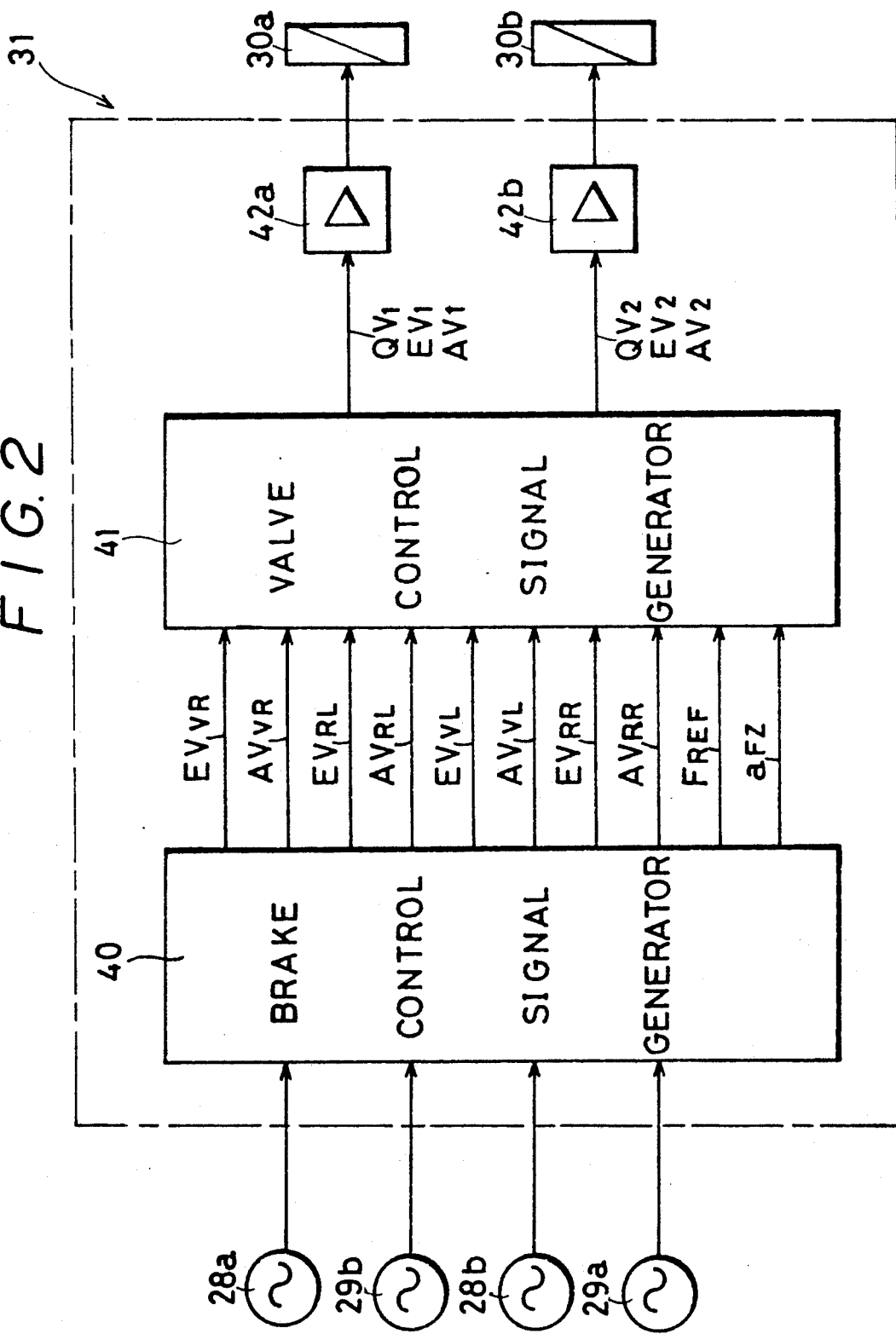
FIG. 2 is a block diagram of a control unit in FIG. 1.

Next, there will be described details of the control unit 31 with reference to FIG. 2.

Output signals from the wheel speed sensors 28a, 28b, 29a and 29b associated with the front wheels 6a and 6b, and rear wheels 11a and 11b are supplied to a brake control signal generating circuit 40. Output terminals of the brake control signal generating circuit 40 are connected to a valve control signal generating circuit 41 which includes a program according to this invention. Wheel speed signals are formed from the output signals of the wheel speed sensors 28a, 28b, 29a and 29b, and further deceleration signals, acceleration signals and slip signals are formed on the basis of the wheel speed signals, in the brake control signal generator 40 which has well-known construction.

These signals are logically combined to generate brake pressure-holding control signals $EV_{vr}$, $EV_{rl}$, $EV_{vl}$ and $EV_{rr}$ $AV_{vl}$ and $AV_{rr}$. The letters "EV" represent "brake pressure-holding", and the letters "AV" represents "brake pressure-decreasing". Suffix letters "vr," "vl", "rr" and "rl" represent "right front wheel" "left front wheel" "right rear wheel" and "left rear wheel", respectively. These and other suffix letters herein have the same meaning whether appearing in upper case or lower case letters.

Further, an approximate vehicle speed signals $F_{ref}$ and a vehicle deceleration signals $a_{fz}$ are formed on the basis of the wheel speed signals in the brake control signal generating circuit 40. The above signals are supplied to the valve control signal generating circuit 41.

According to this embodiment, the vehicle speed is simulated by an approximate vehicle speed generator in the brake control signal generating circuit 40. Before the deceleration of the wheel on braking reaches the predetermined level or before the deceleration signal is generated from an acceleration/deceleration signal generator, the wheel speed signal from a wheel speed signal generator is obtained as the approximate vehicle speed, as it is, from the approximate vehicle speed generator. However, after the deceleration signal is generated, from the acceleration/deceleration signal generator, such an approximate vehicle speed signal is generated from the approximate vehicle speed signal generator that decreases linearly with time at a predetermined gradient. When the output of the wheel speed signal generator becomes higher than the linear approximate vehicle speed signal, the former is obtained as the approximate vehicle speed, as it is, from the approximate vehicle speed generator.

The output of the approximate vehicle speed generator is the output $F_{ref}$.

Generally, a slip ratio S of the wheel is given by the following formula:

$$S = 1 - \frac{\text{wheel speed}}{\text{vehicle speed}}.$$

According to this embodiment, the approximate vehicle speed is used as the vehicle speed in the above formula.

Figure 3:
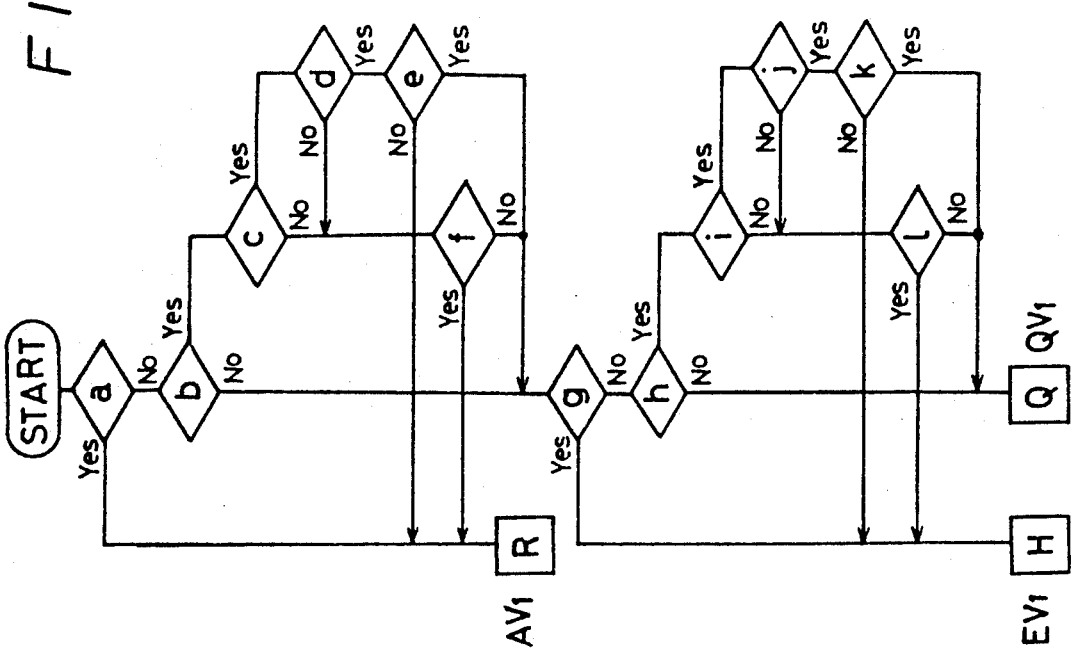
FIG. 3 is a control flow chart of a program included in a valve control signal generator in the control unit, according to a first embodiment of this invention.

The logical combination of the above signals is shown by the flow chart of FIG. 3. The valve control signals $AV_1$ and $AV_2$ for relieving the brake, the valve control signals $EV_1$ and $EV_2$ for holding the brake valve control signals $QV_1$ and $QV_2$ for increasing the brake are generated as required. According to this embodiment, a current level is "0" for the brake pressure increasing control signals $QV_1$ and $QV_2$. The output signals i.e. the valve control signals, are supplied to amplifiers 42a and 42b, and are amplified thereby to be supplied to the solenoid portions 30a and 30b of the electro-magnetic three position valve devices 4a and 4b. The electro-magnetic three position valve devices 4a and 4b take selectively one of the positions A, B and C for increasing the brake pressure, holding the brake pressure or decreasing the brake pressure, in accordance with the current levels of the valve control signals. The signals Sa and Sb shown in FIG. 1 include the signals $AV_1$, $EV_1$ and $QV_1$ and $AV_2$, $EV_2$ and $QV_2$, respectively.

The control unit 31 further includes, although not shown, a motor drive circuit. When any one of the signals $AV_1$ and $AV_2$ is generated, the motor drive signal Qo is generated from the control unit 31. It continues to generate during the anti-skid control operation.

Next, a program included in the valve control signal generating circuit 41 in FIG. 2 will be described with reference to FIG. 3.

This embodiment is applied to the vehicle of the FF type (Front engine, Front drive type). The program of FIG. 3 is shown only for the front and rear wheels of one of the two brake conduit systems. It is determined by the program of FIG. 3 how the valve should be controlled, on the basis of the brake control signals, the approximate vehicle speed signal $F_{ref}$, the vehicle deceleration signal $a_{fz}$ from the front and rear wheels of the one brake conduit system. The same program is applied to the other conduit system. First, the output signals from the wheel speed sensors 28a, 28b, 29a and 29b associated with the front and rear wheels are supplied to the brake control signal generating circuit 40 of the upper stage. The above described brake pressure-holding control signal $EV_{vr}$ and brake pressure-decreasing control signal $AV_{vr}$ etc. are formed in the brake control signal generating circuit 40. They are applied to the program of FIG. 3.

In FIG. 3, it is determined at step a whether the brake pressure-decreasing control signal AV (the suffix is omitted since only the one brake conduit system is described here) is generated from the front wheel, or not. When the brake pressure-decreasing control signal AV is generated from the front wheel, (i.e. when Yes is the judgment) the brake decreasing signal AV1 is generated as the valve control signal at a first decision step R. Thus, the brake is relieved in the one conduit system. The suffix "1" (as 1 of $AV_1$) is appended to the valve control signals AV, EV and QV as $AV_1$, $EV_1$ and $QV_1$ to represent the one conduit system including the one valve device 4a.

When the brake pressure-decreasing control signal AV is not generated from the front wheel, (i.e., when No is the judgment) it is determined at the next step b whether the brake decreasing control signal AV is generated from the front wheel, or not.

When Yes is the judgment, it is next determined at step c whether the vehicle deceleration $a_{fz}$ is larger than 0.6 g, or not ($a_{fz} \geq 0.6$ g?).

When Yes is the judgment of the step c, the difference is calculated at step d between the approximate vehicle speed $F_{ref}$ and the wheel speed $V_{front}$ of the front wheel being on the same road side as the rear wheel which is generating the brake decreasing control signal AV, and it is further determined at this step d whether this difference is smaller than 5 km/h, or not ($F_{ref} - V_{front} \leq 5$ KM/h?).

When Yes is the judgment of step d, it is next determined at step e whether the slip ratio of the rear wheel of the other conduit system is smaller than 1.5%, or not. When No is the judgment of step e, the brake pressure decreasing signal $AV_1$ is generated at the first decision step R for the one conduit system. When Yes is the judgment resulting at step e, a judgment is effected at next step g. A Yes determination at step d and a No determination at step e indicates that the vehicle is running straight on the road.

Further, a Yes determination at step d and/or Yes determination at step e indicates that the vehicle is curved on the road.

When the vehicle deceleration $a_{fz}$ is smaller than 0.6 g, (i.e., when No is the judgment of step c) it is determined at step f whether the slip ratio of the rear wheel of the other conduit system is smaller than 15%, or not. When Yes is the judgment resulting at step f, the brake decreasing signal $AV_1$ is generated at the first decision step R. Thus, both of the rear wheels can be prevented from locking. When No is the judgment resulting at step f, the judgment of the next step g is effected.

It is determined at step g whether the brake pressure-holding control signal EV is generated from the front wheel of the one conduit system, or not. When Yes is the judgment resulting at step g, the brake pressure holding signal $EV_1$ is generated as the valve control signal at a second decision step H for the one conduit system. Thus, the brake pressure is maintained at constant in the one conduit system. When No is the judgment resulting at step g, it is determined at step h whether the brake pressure-holding signal EV is generated from the rear wheel of the one conduit system, or not. When No is the judgment resulting at step h, the brake increasing signal $QV_1$ of the current level "0" is supplied as the valve control signal to the solenoid portions 30a at a third decision step Q. Thus, the brake pressure is increased in the one conduit system.

When it is determined at step h that the brake pressure-holding control signal EV is generated from the rear wheel, (i.e. Yes) it is then determined at the next step i whether the vehicle deceleration $a_{fz}$ is larger than 0.6 g or not.

When Yes is the judgment resulting at step i, it is next determined at step j whether the difference between the approximate vehicle speed $F_{ref}$ and the wheel speed $V_{front}$ of the front wheel on the same side as the rear wheel generating now the brake pressure-holding control signal EV is smaller than 5 km/h, or not. When No is the judgment resulting at step j, it is determined at the next step l whether the slip ratio of the rear wheel of the other conduit system is larger than 15%, or not. When Yes is the judgment resulting at step l, the brake pressure-holding signal $EV_1$ is generated at the second decision step H. When No is the judgment resulting at step l, the brake pressure increasing signal $QV_1$ is generated at the third decision step Q.

When Yes is the judgment resulting at step j, it is then determined at step k whether the slip ratio of the rear wheel of the other conduit system is smaller than 1.5%, or not.

When No is the judgment resulting at step k, the braking force is maintained at constant. 1 When Yes is the judgment resulting at step k, the brake pressure increasing signal QV1 is generated at the third decision step Q. When Yes is the judgment resulting at step j, and No is the judgment resulting at step k, it is indicated that the vehicle is running straight on the road.

In the above described manner, the brake fluid pressure of the one conduit system is increased, decreased or maintained at constant, depending on what brake control signal is generated from the front wheel and rear wheel of the one conduit system, whether the vehicle deceleration is larger or smaller than the predetermined value, whether the difference between the approximate vehicle speed and the wheel speed $V_{front}$ of the front wheel of the other conduit system is smaller or larger than the predetermined value and whether the slip ratio of the rear wheel of the other conduit system is smaller or larger than the first and second predetermined ratios. Thus, the brake control signal of the front wheel is preferentially used to that of the rear wheel, and the fluid pressure control valve is controlled also by the brake control signal of the rear wheel under the special conditions. The brake pressure in the other conduit system is controlled in the same manner as that of the one conduit system above described.

Since the brake pressure is controlled in the above described manner, the steering performance is stable and the braking force can be prevented from being insufficient. The braking distance can be shortened. Further, it can be avoided that "flat-spot" and "burst" occur on the rear wheel.

FIG. 4 shows a program included in a control unit of an anti-skid brake fluid pressure control apparatus for a vehicle according to an alternative embodiment of this invention. The conduit circuit and the block diagram are similar to those of the first embodiment as shown in FIG. 1 and FIG. 2. This embodiment is applied to a vehicle of 4 WD type (four wheel drive type), in contrast to the first embodiment. Particularly, the first and second embodiment are different from each other in the judgment manner whether the vehicle is running straight on the road, or not.

Also in this embodiment, the brake control signals of the front wheel and rear wheel of only the one conduit system will be described in the program of FIG. 4.

First, it is judged at step m whether the brake decreasing control signal AV is generated from the front wheel, or not.

When Yes is the judgment resulting at step m, the decreasing signal AV1 is generated as the valve control signal at the first decision step R. When No is the judgment resulting at step m, it is then determined at the next step n whether the brake decreasing control signal AV is generated from the rear wheel, or not. When No is the judgment resulting at step n, it is determined by next step r whether the brake holding control signal EV is generated from the front wheel, or not.

When signal EV is generated from the front wheel, (i.e. Yes) the brake pressure holding signal $EV_1$ is generated as the valve control signal at the second decision step H. When No is the judgment resulting at step r, it is determined at the next step s whether the brake holding control signal EV is generated from the rear wheel, or not.

When signal EV is not generated from the rear wheel, the brake increasing signal $QV_1$ is generated as the valve control signal at the third decision step Q.

When it is determined at step s that the brake holding control signal EV is generated from the rear wheel, it is then determined at the next step t whether the vehicle deceleration $a_{fz}$ is larger than 0.6 g, or not.

When Yes is the judgment resulting at step t it is determined at the next step u whether the difference between the approximate vehicle speed $F_{ref}$ and the wheel speed $V_{front}$ of the front wheel on the same side as the rear wheel generating now the brake holding signal EV is smaller than 5 km/h, or not. When No is the judgment resulting at step u, it is determined at the next step v whether the slip ratio of the rear wheel of the other conduit system is larger than 15% or not. When Yes is the judgment resulting at step u, the brake pressure holding signal $EV_1$ is generated as the valve control signal at the second decision step H. When No is the judgment resulting at step v, the brake pressure increasing signal $QV_1$ is generated as the valve control signal at the third decision step Q. It is determined at step n whether the brake decreasing signal AV is generated from the rear wheel, or not; as above described.

When Yes is the judgment resulting at step n, it is next determined at step o whether the vehicle deceleration $a_{fz}$ is larger than 0.6 g or not ($a_{fz} \geq 0.6$ g?).

When Yes is the judgment resulting at step o, the difference is calculated at step p between the approximate vehicle speed $F_{ref}$ and the wheel speed $V_{front}$ of the front wheel ls on the same road side as the rear wheel generating now the brake decreasing signal AV, and it is further determined at this step p whether this difference is smaller than 5 km/h, or not ($F_{ref} - V_{front} \leq 5$ km/h?).

When Yes is the judgment resulting at step p, the brake pressure decreasing signal $AV_1$ is generated as the valve control signal at the first decision step R for the one conduit system. When No is the judgment resulting at step p, it is determined at the next step g whether the slip ratio of the rear wheel of the other conduit system is larger than 15%, or not. When Yes is the judgment resulting at step g, the brake decreasing signal $AV_1$ is generated as the control signal at the first decision step R. When No is the judgment resulting at step g, the judgment of the next step r is effected.

Since this embodiment is applied to the vehicle of the 4 WD type, the judgment of whether the vehicle is running straight on the road, or not, depends only on the fact that the difference between the approximate vehicle speed and the wheel speed $V_{front}$ of the front wheel on the same side as the rear wheel generating now the brake decreasing signal, is smaller than 5 km/h. In the 4 WD vehicle, the rear wheels are combined with each other through the example, "LSD (Limitted Slip Differential)" mechanism, and so the rotational force of the one rear wheel of higher speed is transmitted to the other rear wheel of lower speed, so that the slip amounts of the rear wheels are made to be nearly equal to each other. Accordingly, step u depends only on the fact (Fref−Vfront≦5 km).

Since the brake pressure is controlled in the above described manner, the steering performance is stable, and the braking force can be prevented from being insufficient. The braking distance can be shortened. Further, it can be avoided that "flat-spot" and "burst" occur on the rear wheel.

FIG. 5 shows a program included in a control unit of an anti-skid brake fluid pressure control apparatus for vehicle according to a third embodiment of this invention. This embodiment is applied to a vehicle of the FF type. The conduit circuit and the block diagram are similar to those of the first and second embodiments, as shown in FIG. 1 and FIG. 2. However, the valve control signal generator in the control unit according to this embodiment includes a pulse generator. The program of FIG. 5 is shown only for the front and rear wheels of one of the two brake conduit systems, as in the above embodiments. It is determined by the program of FIG. 5 how the valve should be controlled, on the basis of the brake control signals, the approximate vehicle speed signal Fref, the vehicle deceleration signals $a_{fz}$ from the front and rear wheels of the one brake conduit system. In FIG. 5, it is determined at step a whether the brake pressure-decreasing control system AV (the suffix is omitted since only one brake conduit system is described here) is generated from the front wheel or not. When the brake pressure-decreasing control signal AV is generated from the front wheel, or when Yes is the judgment, the brake decreasing signal $AV_1$ is generated as the valve control signal at the first decision step R. Thus, the brake is relieved in the one conduit system. The suffix "1" (as 1 of $AV_1$) is appended as the valve control signals $AV_1$ $EV_1$ and $QV_1$ to represent the one conduit system including the one valve device 4a.

When the brake pressure-decreasing control signal AV is not generated from the front wheel, or when No is the judgment at step a, it is determined at the next step b whether the brake decreasing signal AV is generated from the rear wheel, or not.

When Yes is the resulting judgment, it is next determined at step c whether the vehicle deceleration $a_{fz}$ is larger than 0.6 g or not ($a_{fz} \geq 0.6$ g?).

When Yes is the judgment resulting at step c, the difference is calculated at step d between the approximate vehicle speed Fref and the wheel speed Vfront of the front wheel on the same road side as the rear wheel generating now the brake decreasing signal AV, and it is further determined at this step d whether this difference is larger than 5 km/h, or not (Fref−Vfront≦5 k/h?).

When Yes is the judgment resulting at step d, it is determined at the next step e whether the slip ratio of the rear wheel of the other conduit system is smaller than 1.55, or not. When No is the judgment resulting at step e, a pulse generator in the control unit 31 is actuated by step p. If yes is the judgment resulting at step d and No is the judgment of step e, the vehicle is judged to be now running straight on the road. However, if, although Yes is the judgment of step d, Yes is the judgment of step e, the vehicle is indicated to be now curving on the road.

The pulse generator in the control unit 31 generates pulses P as shown in FIG. 6B. The signal AV is generated from the rear wheel as shown in FIG. 6A. The pulses P continue during the duration of the signal AV as shown in FIG. 6A and FIG. 6B. ON time of the pulses P as shown in FIG. 6B is 5 milli-sec and OFF time of the pulses P is 5 milli-sec. The pulses P are supplied to a step q. It is determined at step q whether the pulses P are now ON or OFF. When the pulses P are now ON, or when they are at high levels, a Yes determination is obtained from step q. Thus, the pressure decreasing signal $AV_1$ is generated at the first decision step R. The braking forces of the rear wheel and front wheel of the one conduit system are decreased. When the pulses P are OFF, a No determination is obtained from step q. Thus, the pressure holding signal $EV_1$ is obtained at the second decision step H. The braking forces of the rear wheel and front wheel of the one conduit system are maintained at constant. Accordingly, the brake is stepwisely relieved by step q. When the vehicle deceleration $a_{fz}$ is smaller than 0.6 g, or when No is the judgment resulting at step c, it is determined at the next step f whether the slip ratio of the other rear wheel of the other conduit system is larger than 15%, or not. When Yes is the judgment resulting at step f, the brake decreasing signal $AV_1$ is generated at the first decision step R. Thus, both of the rear wheels can be prevented from locking. When No is the judgement resulting at step f, the next step q is effected.

If No is the judgment resulting at step d, the same determination as at step f is effected at step f'. When Yes is the judgment resulting at step f', the pulse generator is actuated at step p. When No is the judgment resulting at step f', the determination of the next step g is effected.

It is determined at step g whether the brake holding control signal EV is generated from time the front wheel of the one conduit system, nor not. When Yes is the judgment resulting at step g, the brake pressure holding signal $EV_1$ is generated at the second decision step H for the one conduit system. Thus, the brake pressure is maintained at constant in the one conduit system. When No is the judgment resulting at step g, it is determined at step h whether the brake holding control signal EV is generated from the rear wheel of the one conduit system, or not. When No is the judgment resulting at step h, the brake increasing signal $QV_1$ of the current level "0" is supplied as the valve control signal to the solenoid portions 30a at the third decision step Q. Thus, the brake pressure is increased in the one conduit system.

When it is determined at step h that the brake holding control signal EV is generated from the rear wheel, it is determined at the next step i whether the vehicle deceleration $a_{fz}$ is larger than 0.6 g, or not.

When Yes is the judgment resulting at step i, it is determined by step j whether the difference between the approximate vehicle speed $F_{ref}$ and the wheel speed $V_{front}$ of the front wheel on the same side as the rear wheel generating now the brake holding control signal EV is smaller than 5 km/h, or not. When No is the judgment resulting at step j, it is determined at the next step l whether the slip ratio of the rear wheel of the other conduit system is larger than 15%, or not. When Yes is the judgment resulting at step l, the brake pressure holding signal $EV_1$ is generated at the second decision step H. When No is the judgment resulting at step l, the brake pressure increasing signal $QV_1$ is generated at the third decision step Q.

When Yes is the judgment resulting at step j, it is determined at step k whether the slip ratio of the rear wheel of the other conduit system is smaller than 1.5%, or not.

When No is the judgment resulting at step k, the braking force is maintained at constant. When Yes is the judgment resulting at step k, the brake pressure increasing signal $QV_1$ is generated at the third decision step Q. When Yes is the judgment resulting at step j, and No is the judgment resulting at step k, it is indicated that the vehicle is running straight on the road.

In the above described manner, the brake fluid pressure of the one circuit system is increased, decreased or maintained at constant, depending on what brake control signal is generated from the front wheel and rear wheel of the one conduit system, whether the vehicle deceleration is larger or smaller than the predetermined value, whether the difference between the approximate vehicle speed and the wheel speed $V_{front}$ of the front wheel of the other conduit system is smaller or larger than the predetermined value and whether the slip ratio of the rear wheel of the other conduit system is smaller or larger than the first and second predetermined ratios. Thus, the brake control signal of the front wheel is preferentially used to that of the rear wheel, and the fluid pressure control valve is controlled also by the brake control signal of the rear wheel under the special condition.

Since the brake pressure is controlled in the above described manner, the steering performance is stable and the braking force can be prevented from being insufficient. The braking distance can be shortened. Further, it can be avoided that "flat-spot" and "burst" occur on the rear wheel.

While the preferred embodiments have been described, variations thereto will occur to those skilled in the art within the scope of the present inventive concepts which are delineated by the following claims.

For example, the predetermined values are not limited to the numerals described in the above embodiments.

It is determined in the above embodiments whether the vehicle deceleration $a_{fz}$ is larger than 0.6 g, to judge whether the road on which the vehicle is running has a high frictional coefficient (high-$\mu$) or a low frictional coefficient (low-$\mu$). The above determined value 0.6 g may be increased or decreased.

Further, it is determined in the above embodiments whether the difference between the approximate vehicle speed and the wheel speed of the front wheel on the same side as the rear wheel of the described one conduit system, is smaller than 5 km/h, or not, and it is determined thereby whether the slip ratio of the rear wheel of the other conduit system is smaller than the predetermined value in order to indicate whether the vehicle is running straight on the road or is curving on the road. The above predetermined value 5 km/h may be increased or decreased. The predetermined slip ratios 1.5% and 15% may also be increased or decreased. Instead of the "slip ratio", "slip amount" may be used.

Further, in the above embodiments, the fact that the difference between the approximate vehicle speed and the wheel speed of the front wheel on the same road side as the rear wheel generating the brake control signal, is smaller than the predetermined value, is the condition to detect that the vehicle is running straight on the road.

The above-detecting condition may be altered as follows:

(1) the difference between the rotational speeds of the front wheels is smaller than a predetermined value.

(2) the difference between the rotational speeds of the rear wheels is smaller than a predetermined value.

(3) both of the rear wheels have a larger slip ratio or amount than a predetermined value.

(4) the difference between the rotational speeds of both of the front wheels and the vehicle speed is smaller than a predetermined value.

(5) the difference between the rotational speed of the one front wheel diagonally connected to the one rear wheel generating no brake control signal, and the vehicle speed, is smaller than a predetermined value.

(6) the difference between the rotational speed of the one rear wheel having a smaller value of slip than the other and that of the one front wheel diagonally connected to the one rear wheel having the smaller value of slip is smaller than a predetermined value.

(7) both of the differences between the rotational speeds of the one pair of front and rear wheels, and the other pair of front and rear wheels, connected diagonally to each other, are smaller than a predetermined value.

(8) The combination of at least two of the above altered conditions (1) to (7) and of the detecting conditions described in the above embodiments.

The vehicle is indicated to be running straight on the road, when any of the above conditions (1) to (8) is fulfilled. Further, a filter circuit or a timer circuit may be provided for maintaining parameters which indicate that the vehicle is still running straight on the road for a predetermined time directly after the above conditions have disappeared. Thus, it can be avoided that the vehicle is misjudged to be curving on the road, due to any change of the road surface.

In the above embodiments, the output signals in the control unit 31 are used for detecting that the vehicle is running straight on the road. Instead, an output of a steering angle sensor may be used. When the steering angle is within a predetermined range, the vehicle is indicated to be running straight on the road.

The brake control signal may comprise only a brake pressure-decreasing control signal AV. Or it may comprise a brake pressure-decreasing control signal and a brake pressure-holding control signal and/or a brake pressure-increasing control signal.

The vehicle speed may be detected from a speed sensor to road surface utilizing "Doppler effect". A mercury switch as "G-sensor" may be used for detecting the vehicle deceleration.

The vehicle of the FF type and 4WD type have been described in the above described embodiments. This invention may be applied also to a vehicle of a rear-drive type.

In the above embodiments, the valve control signals $QV_1$ and $QV_2$ are continuously "0", and so they continuously supply current of level "0" to the solenoid portions 30a and 30b of the electro-magnetic three position valve device 4a and 4b. Thus, the brake fluid pressure is continuously increased. Instead, the valve control signals $QV_1$ and $QV_2$ may be changed pulse-likely as "1", "0", "1", "0"-in current level. At that time, the brake fluid pressure is stepwisely increased. In the third embodiment, the ON-time and OFF-time of the pulse generator are 5 milli-sec, respectively. This invention is not limited to the value of 5 milli-sec. The ON-time and the OFF-time may be different from each other. The first ON time may be longer and the sequent ON-times may be constant.

Alternatively, the braking force may be continuously decreased by a continuous signal AV', as shown in FIG. 7C which is a part of a brake decreasing control signal AV from the rear wheel, as shown in FIG. 7A. In the third embodiment, the pulses P are generated during the brake decreasing control signal AV. Instead, pulses P' as shown in FIG. 7B during the time (0 t) within the duration of the brake decreasing control signal AV may be used for decreasing step-wisely the braking force.

In this example also, the pulse ON-time and/or OFF time may be variable. For example, the impulses may be varied in dependence with such a parameter or parameters as a vehicle speed, a vehicle deceleration, a wheel deceleration and a wheel slip ratio.

In the above embodiments, the electro-magnetic three position vale device 4a and 4b, which have the three position A, B and C, are used as shown in FIG. 1. They are alternately changed over between the position B and the position C for decreasing stepwisely the braking force. Instead, two-position three-ports change-over valves may be used. The master cylinder side and the wheel cylinder side are made to communicate with each other in the one position of the two-position three-port change-over valve. The master cylinder side and the wheel cylinder side are interrupted from each other, and the reservoir side and the wheel cylinder side is made to communicate with each other in the other position of the two-position three-port change-over valve.

In that case, the duration of the one position of the two-position three-port change-over valve is made shorter, and the duration of the other position of the two-position three-port change-over valve is made longer, for descreasing stepwisely the braking force. Alternately, the electro-magnetic three position valve device 4a and 4b may be changed over between the A-position and the C-position for decreasing stepwisely in braking force. The durations of the A-position and C-position are also different from each other, as in the above described two-position three-port change-over valve.

Further, in the above embodiments, one electro-magnetic three position valve device 4a or 4b is provided for the one brake conduit system. Instead, two two-position two-port electro magnetic change over valves, or an inlet valve and an outlet valve may be provided for the brake conduit systems. Similar control to that of the above embodiments can be effected with these valves.

What is claimed is:

1. In a fluid-pressure control apparatus for an anti-skid braking control apparatus in a vehicle which includes:
   (A) a pair of front wheels and a pair of rear wheels diagonally connected to said front wheels, respectively, in dual brake conduit systems;
   (B) wheel speed sensors associated respectively with the front and rear wheels for detecting the rotational speeds of the respective wheels;
   (C) a control unit for generating brake control signals corresponding to the rotational behaviors of the respective wheels and valve control signals on the basis of the outputs of said wheel speed sensors; and
   (D) fluid pressure control valve means arranged in the respective brake conduit systems and operable by said valve control signals from said control unit;
   an anti-skid brake control method in which brake control signals from said front wheels are used preferentially to brake control signals from said rear wheels as said valve control signals in the respective brake conduit system, comprising the steps of:
   generating said brake control signal from any one of said wheels;
   identifying the specific wheel from which said brake control signal is generated;
   using said brake control signal as said valve control signal to operate said fluid pressure control valve means in the one brake conduit system to which said specific wheel belongs if said specific wheel is a front wheel of said vehicle and using said brake control signal as said valve control signal to operate said fluid pressure control valve means in the one brake conduit system to which said specific wheel belongs if a said specific wheel is a rear wheel of said vehicle and only if said vehicle is detected to be decelerating at a rate greater than a predetermined reference deceleration and, is further detected to be straight-running or, (b) the other rear wheel is detected to be slipping at a rate greater than a predetermined first reference slip.

2. The method according to claim 1 wherein said straight-running of the vehicle is detected by detecting that the difference between the vehicle speed and the wheel speed of the front wheel on the same side of the vehicle as said rear wheel generating said brake control signal is smaller than a predetermined value.

3. The method according to claim 1, in which said straight-running of the vehicle is detected by detecting that the difference between the vehicle speed and the wheel speed of the front wheel on the same side of the vehicle as the said rear wheel generating said brake control signal is smaller than a predetermined value, and the slip of the other of said rear wheels is larger than a predetermined second reference slip which is smaller than said predetermined first reference slip.

4. An anti-skid brake control method in a fluid-pressure control apparatus for an anti-skid control apparatus according to claim 1, in which said straight-running of the vehicle is detected by detecting that the difference between the rotational speeds of the front wheels is smaller than a predetermined value.

5. An anti-skid brake control method in a fluid-pressure control apparatus for an anti-skid control apparatus according to claim 1, in which said straight-running of the vehicle is detected by detecting that the difference between the rotational speeds of the rear wheels is smaller than a predetermined value.

6. An anti-skid brake control method in a fluid-pressure control apparatus for an anti-skid control apparatus according to claim 1, in which said straight-running of the vehicle is detected by detecting that both of the rear wheels have a larger ratio or amount of slip than a predetermined value.

7. An anti-skid brake control method in a fluid-pressure control apparatus for an anti-skid control apparatus according to claim 1, in which said straight-running of the vehicle is detected by detecting that the difference between the rotational speeds of the front wheels both and the vehicle speed is smaller than a predetermined value.

8. An anti-skid brake control method in a fluid-pressure control apparatus for an anti-skid control apparatus according to claim 1, in which said straight-running of the vehicle is detected by detecting that the difference between the rotational speed of the front wheel diagonally connected to the rear wheel generating no brake control signal, and the vehicle speed, is smaller than a predetermined value.

9. An anti-skid brake control method in a fluid-pressure control apparatus for an anti-skid control apparatus according to claim 1, in which said straight-running of the vehicle is detected by detecting that the difference between the rotational speed of the one rear wheel having smaller slip than the other rear wheel and that of the one front wheel diagonally connected to said one rear wheel, is smaller than a predetermined value.

10. An anti-skid brake control method in a fluid-pressure control apparatus for an anti-skid control apparatus according to claim 1, in which said straight-running of the vehicle is detected by detecting that both of the differences between the rotational speeds of the one front and rear wheels, and the other front and rear wheels, connected diagonally to each other, are smaller than a predetermined value.

11. An anti-skid brake control method in a fluid-pressure control apparatus for an anti-skid control apparatus according to claim 1, in which said straight-running of the vehicle is detected by detecting at least two conditions which can independently indicate said straight running of the vehicle.

12. An anti-skid brake control method in a fluid-pressure control apparatus for an anti-skid control apparatus according to claim 1, in which a filter circuit or a timer circuit is provided for indicating that the vehicle remains straight running for a predetermined time immediately after said vehicle is detected to be straight running.

13. An anti-skid brake control method in a fluid-pressure control apparatus for an anti-skid control apparatus according to claim 1, in which said straight-running of the vehicle is detected by detecting that a steering angle sensor output is within a predetermined range.

14. An anti-skid brake control method in a fluid-pressure control apparatus for an anti-skid control apparatus according to claim 1, in which the brake control signal comprises at least a brake pressure-decreasing control signal (AV).

15. An anti-skid brake control method in a fluid-pressure control apparatus for an anti-skid control apparatus according to claim 14, in which, when said brake control signal from the rear wheel is used as said valve control signal and it is said brake pressure-decreasing control signal, the time of said valve control signal is limited within the duration of said brake pressure-decreasing control signal from the rear wheel.

16. An anti-skid brake control method in a fluid-pressure control apparatus for an anti-skid control apparatus according to claim 5, in which said valve control signal is pulse-likely changed.

17. In a fluid-pressure control apparatus for an anti-skid braking control apparatus in a vehicle which includes
(A) a pair of front wheels and a pair of rear wheels diagonally connected to said front wheels, respectively, in dual brake conduit systems;
(B) wheel speed sensors associated respectively with the front and rear wheels for detecting the rotational speeds of the respective wheels;
(C) a control unit for generating brake control signals corresponding to the rotational behaviors of the respective wheels and valve control signals on the basis of the output of said wheel speed sensors; and
(D) fluid pressure control valve means arranged in the respective brake conduit systems and operable by said valve control signals from said control unit;
an anti-skid brake control method in which brake control signals from said front wheels are used preferentially to brake control signals from said rear wheels as said valve control signals in the respective brake conduit systems, comprising the steps of:
generating said brake control signal from any one of said wheels;
identifying the specific wheel from which said brake control signal is generated;
when said specific wheel is a front wheel of said vehicle, using said brake control signal as said valve control signal to operate said fluid pressure control valve means in the one brake conduit system to which said specific wheel belongs; and
when said specific wheel is a rear wheel of said vehicle, using said brake control signal as said valve control signal to operate said fluid pressure control valve means in the one brake conduit system to which said specific wheel belongs only if said vehicle is detected to be decelerating at a rate greater than a predetermined reference deceleration and is further detected to be straight-running, or if the other of said rear wheel is detected to be slipping at a rate greater than a predetermined first reference slip.

* * * * *